Jan. 22, 1963 W. P. ERICKS 3,074,833
DIMENSIONAL STABILIZATION OF CELLULOSE ARTICLES
Filed Nov. 12, 1959

INVENTOR.
Walter P. Ericks
BY
ATTORNEYS

United States Patent Office 3,074,833
Patented Jan. 22, 1963

3,074,833
DIMENSIONAL STABILIZATION OF
CELLULOSE ARTICLES
Walter P. Ericks, Lockport, N.Y., assignor to
The Upson Company, Lockport, N.Y.
Filed Nov. 12, 1959, Ser. No. 852,553
9 Claims. (Cl. 154—43)

The present invention relates to the treatment of articles composed of cellulose and more particularly to the impregnation thereof with reactants which produce a resinous material in situ.

It is an object of the invention to provide materials composed of natural cellulose fibers which are dimensionally stable when subjected to varying humidity conditions or when wet with water.

Another object of the invention is to provide a dimensionally stabilized article having increased tensile strength in both a wet and dry condition.

Still another object of the present invention is to provide dimensionally stabilized cellulose articles having any desired degree of stiffness.

Yet another object of the invention is to provide a dimensionally stabilized article composed of cellulose fibers which has good anti-static properties.

Still another object of the invention is to provide a dimensionally stable laminate of sheets of felted fibrous cellulose material, the plies of which are firmly adhered without the use of pressure other than that necessary to ensure good surface contact between the individual plies.

Yet another object of the invention is to provide a process of preparing cellulose articles having the above-enumerated desirable properties.

Figure 1:
Figure 2:
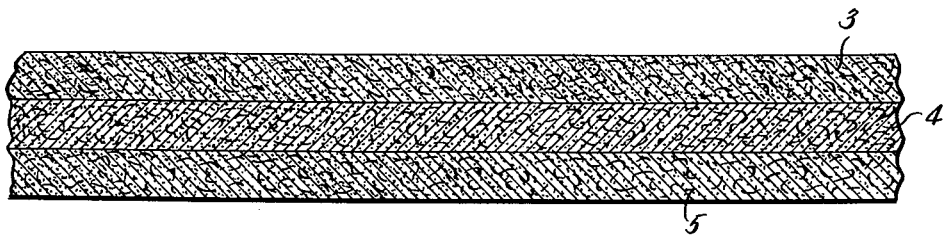

Other and further objects of the invention will be apparent from the following detailed description taken in conjunction with the drawings in which:

FIGURE 1 shows a sheet of felted cellulose fibers impregnated with a dimensional stabilizing and stiffening agent produced in accordance with the present invention; and FIGURE 2 shows a laminated article composed of individual plies of felted cellulose fiber sheets impregnated with a copolymer formed in accordance with the present invention and adhered without the use of a heated press.

I have previously discovered that articles composed of cellulose may be greatly improved as to their dimensional stability by impregnating them with three different types of monomeric partial esters of a polycarboxylic acid and a polyhydric alcohol which esters have a plurality of hydroxyl groups attached to different carbon atoms in the molecule. One such ester is a monoester which has only one polycarboxylic acid residue and only one polyhydric alcohol residue in the molecule. Another ester-type stabilizer is that which has only one polycarboxylic acid residue and at least two polyhydric alcohol residues in the molecule although it will be apparent that there can be more than two of the alcohol residues if the acid used in forming the ester contains more than two carboxyl groups. The third type of ester is that which contains only one polyhydric alcohol residue and at least two polycarboxylic acid residues in the molecule, although again there can be more than two polycarboxylic acid residues if the alcohol used to produce the ester contains more than two hydroxyl groups.

While all such esters have been found to dimensionally stabilize cellulose to a considerable degree, the stabilized products are unsuitable for numerous purposes because the esters also have a pronounced softening or plasticizing action on cellulose, resulting in a soft and flaccid article. Moreover, cellulose articles impregnated with these esters are often lacking in tensile strength and resistance to water.

This problem has been solved to a degree by including varying amounts of a thermosetting resin, such as a urea-formaldehyde, phenol-formaldehyde or melamine-formaldehyde resin in an early stage of condensation in the impregnating solution containing the partial ester and then, after impregnation, heating the article to dry it and set the resin. This, however, has the disadvantage that the resins are expensive and that in many instances such large amounts are required to obtain the strength and stiffness desired that undesirable properties are imparted to the cellulose article being treated.

I have found that the problem may be solved much more effectively and with the attainment of much stronger articles if the cellulose material is impregnated with a resinous copolymer of an ester of the type described above which contains a carbon to carbon double bond in either the polycarboxylic acid or polyhydric alcohol portion of the molecule, or both, and a compatible polymerizable liquid monomeric compound containing an ethylenic linkage. Examples of such polymerizable monomers are vinyl, allyl and acrylic monomers.

The resin produced in accordance with the present invention is not to be confused with copolymers of unsaturated polyesters and vinyl compounds such as those which are the subject matter of the Ellis Patent 2,255,313. Such resins are produced by first reacting an $\alpha,\beta$-unsaturated dicarboxylic acid and a glycol to an advanced state of esterification to produce a product of low acid number before copolymerizing it with a liquid monomeric vinyl compound. Thus it is seen that the polyesters are themselves resinous materials prior to the copolymerization with the vinyl compound as contrasted with the monomeric, non-resinous esters which are copolymerized with a vinyl compound in accordance with the present invention. The resinous polyesters do not have the dimensional stabilizing effect of the monomeric esters, and accordingly, the desired product would not be obtainable, if an attempt were made to practice the present invention using the polyesters.

Cellulose articles may be impregnated by a one-stage impregnation technique using a single impregnating solution containing the polymerizable liquid monomer and either the individual reactants which subsequently form the desired unsaturated ester or with a preformed monomeric unsaturated ester. For the best results, however, a two-step impregnation should be used. In accordance with this procedure, the cellulose material is impregnated with a solution containing the unsaturated ester, dried, then impregnated with the liquid polymerizable monomer and, finally, heated to copolymerize the ester and vinyl, or similar, monomer to form in situ the resin which gives the final product the desirable properties enumerated above. Apparently by this technique the unsaturated ester molecule is better able to attach itself to the cellulose molecule in such a way as to exert a maximum dimensional stabilizing effect.

As stated above, the unsaturated partial esters employed in the present invention are essentially monomeric in nature prior to copolymerization with the vinyl, or similar, monomer. That is to say, there occurs in the ester molecule no repetition of any structural unit containing the residue of both a polycarboxylic acid and a polyhydric alcohol. In other words, there can be in the ester molecule no more than one residue of one of the original reactants, either acidic or alcoholic, although as pointed out above, there can be more than one residue of either of the reactants so long as there is no more than one residue of the other.

The desired partial ester is readily produced. The monoester containing only one polycarboxylic acid residue and only one polyhydric alcohol residue is made as described in my Patent 2,629,701, reissued as Re. 23,866, by esterifying at an elevated temperature equimolecular amounts of a polycarboxylic acid and a polyhydric alcohol, thus assuring that one molecule of the acid reacts with one molecule of the alcohol. The reaction is terminated by cooling when titration of a sample shows that formation of the monoester is substantially complete. This will obviously be when a fraction $1/n$ of the total acidity of the reaction mixture has been consumed where $n$ is the number of carboxyl groups in the polycarboxylic acid.

The polyacid esters, those containing more than one polycarboxylic acid residue in the molecule, are made by reacting $n$ moles of acid with one mole of polyhydric alcohol where $n$ is the number of hydroxyl groups (at least two) which are to enter into the esterification reaction. Again the reaction can be followed and terminated at the desired point by titrating samples of the reaction mixture. When the total acidity of the reaction mixture has been reduced by an amount which indicates that $n$ moles of acid have entered into the esterification reaction for each mole of alcohol present, the reaction is substantially complete.

In order to produce the third class of monomeric unsaturated esters suitable for use in the present invention, $n$ moles of polyhydric alcohol are caused to react with each mole of polycarboxylic acid where $n$ is the number of carboxyl groups (at least two) which are to enter into the esterification reaction. In the usual case in which all of the carboxyl groups are to be reacted, the reaction is continued until a low acid number of 5 to 50 is reached, at which point it may be assumed that the reaction is substantially complete and it is then terminated as disclosed above. In forming this type of ester, it has been found desirable to employ an excess of polyhydric alcohol to insure substantial completion of the reaction and the excess may be removed after termination of the reaction by distillation under reduced pressure.

The esters having more than one polyhydric alcohol residue in the molecule are those preferred for use in the present invention because they are the least acid, being substantially neutral when all of the carboxyl groups of the polycarboxylic acid are reacted. Dimensional stabilizing agents of acid reaction have disadvantages for some purposes, both because of the corrosive nature of the impregnating solutions prior to use and because the acidic esters have a deleterious effect on certain types of impregnated articles.

Moreover, it should be pointed out that although, as indicated, the present invention may be practiced with some degree of success using esters which are the reaction product of any polycarboxylic acid or polyhydric alcohol so long as at least one of these reactants is unsaturated, it is preferred that dicarboxylic acids or their anhydrides and dihydric alcohols (glycols) be employed in forming the unsaturated esters. If the ester is to be unsaturated in the polycarboxylic acid portion of the molecule, it is preferred that the dicarboxylic acid or anhydride used in its preparation be of the $\alpha,\beta$-unsaturated type. In fact, it may be stated that the dialkylol esters formed by reacting such acids with an excess of saturated dihydric alcohols have been found to be the most desirable for copolymerization with a vinyl, or similar, monomer in carrying out the present invention.

Also, it may be stated that when the ester is to be of the neutral type containing one dicarboxylic acid residue and two dihydric alcohol residues, it is preferred that these esters be asymmetric in nature because of ease of their preparation. They are produced by reacting equimolecular quantities of a dicarboxylic acid, or preferably its anhydride, and a high boiling point diol, the reaction being controlled at a definite temperature to produce almost pure monoester with little or no by-products. The monoester thus produced can then be made to react with an excess of a lower boiling diol to esterify the free carboxyl group with the second diol and the excess of lower boiling diol is then easily removed from the product by distillation. Thus, a large excess of the lower boiling diol may be used to insure complete esterification and yet produce a quite pure, unsaturated ester having good dimensional stabilizing properties.

Acid anhydrides particularly suitable for the preparation of the monomeric unsaturated esters of this invention are those of maleic, itaconic, citraconic, dichloromaleic, ethyl maleic, phenyl maleic, phthalic, and succinic acids and the like. Dicarboxylic acids which may be used in the preparation of the esters include maleic, fumaric, itaconic, citraconic, mesaconic, glutaconic, succinic, tartaric, adipic, suberic, azelaic, and sebacic acids and the like.

Glycols particularly suitable for the preparation of the unsaturated monomeric esters comprise ethylene glycol, propylene glycol, 1,3-butylene-glycol, 2,3-butylene-glycol, 1,4-butylene-glycol, 1,5-pentanediol, diethylene glycol, triethylene glycol, polypropylene and polyethylene glycols having molecular weights up to 6,000, 2-butene-1,4-diol, 3-hexene-2,5-diol and the like.

The esters employed in the invention can also be prepared by reacting an alkylene oxide with one or both of the carboxyl groups of the dicarboxylic acid. In carrying out the synthesis of an asymmetric ester containing two glycol residues for each dicarboxylic acid residue, the monoester can first be prepared by reaction of a mole of glycol with one mole of dicarboxylic acid or its anhydride. The remaining free carboxyl group of the monoester thus formed can be reacted with one mole of alkylene oxide, such as ethylene oxide, propylene oxide, butylene oxide and the like.

Also, it should be understood that equivalents of the polycarboxylic acid, itself, or its anhydride may be employed in forming the monomeric unsaturated esters of the present invention. For example, esters of the acid with a low molecular weight monohydric alcohol may be used as well as acid halides thereof. It will be understood, therefore, that when the term "acid" is used in the annexed claim, this term is intended to include the ester-forming materials which are equivalents of the acid, itself.

It will be noted that the above listing of preferred reactants for use in the preparation of unsaturated monomeric esters include examples of saturated and unsaturated compounds in connection with both the acidic and alcoholic compounds. It will be understood, of course, from what has been stated earlier, that if a saturated acid is employed in the preparation of the ester, an unsaturated alcohol must be selected and vice-versa. However, as also stated above, both the acid and alcohol may be unsaturated.

Further, it should be pointed out that in the practice of the present invention, saturated monomeric esters of a polyhydric alcohol and a polycarboxylic acid, which esters themselves exert a dimensional stabilizing effect on cellulose materials may be employed in admixture with the unsaturated monomeric esters which must be present. The presence of the saturated esters will obviously not deleteriously affect dimensional stabilization of the cellulose, but will, of course, limit the amount of the unsaturated monomeric ester which may be impregnated into the celllose material, and in this manner lower the upper limit of the amount of vinyl or similar unsaturated compound which may be incorporated into the final product by copolymerization with the unsaturated ester. If it is desired that a mixture of saturated and unsaturated monomeric esters be present in the impregnating solution, this mixture can be formed either by mixing previously produced esters, or by producing the saturated and unsaturated esters simultaneously by reacting a mixture including both saturated and unsaturated polycarboxylic acids or both saturated and unsaturated polyhydric alcohols.

The temperatures employed in the esterification reactions just described are not critical. The reaction mixture must ordinarily be heated to something over 100° C. when an acid anhydride is present to initiate the reaction which is, itself, exothermic, while the anhydride ring is being opened. Heating should be contained at a temperature below 150° C. after the spontaneous rise in temperature to ensure completion of the reaction. When a polycarboxylic acid is esterified then the reaction mixture may be heated to as high as 220° C. without damaging the ester produced. As stated earlier, the reaction is terminated by cooling when titration of a sample shows that the desired ester has been produced. No extraneous inert solvent is necessary to serve as a medium for the reaction, since the polycarboxylic acid will dissolve in and react with the polyhydride alcohol.

There are a large number of compatible polymerizable liquid monomeric compounds containing an ethylenic linkage which may be employed for copolymerization with the monomeric esters just described in accordance with the present invention. Vinyl, acrylic and allyl monomers have already been mentioned as exemplary of compounds of this type and of these vinyl compounds are preferred. The one compound which has been found most desirable for copolymerization with the unsatrated ester is styrene, both because it is commercially available and relatively inexpensive, and because particularly suitable properties are imparted to the final product when this material is used.

The following is a listing of other specific compounds which are exemplary of those which may be copolymerized with the monomeric unsaturated esters in carrying out this invention: α-methyl styrene, dichlorostyrene, vinyl toluene, vinyl acetate, vinyl butyrate, acrylic acid, methacrylic acid, methyl methacrylate, N-vinyl-2-pyrrolidone, diallyl phthalate, diallyl digycollate, diallyl maleate, vinyl chloride, ethyl vinyl ether, isopropyl vinyl ether, and n-propyl vinyl ether.

As stated earlier, a method for carrying out the present invention may involve either a one-step or two-step impregnation with the latter being greatly preferred. It is to be emphasized, however, that the unsaturated ester must be in essentially monomeric form, as explained above, when it first contacts the cellulose if effective dimensional stabilization of the final product is to be obtained. Apparently, the individual ester molecules must penetrate the fibrils of the cellulose and attach themselves to the individual cellulose molecules. Copolymerization of the so-attached ester molecules with molecules of the liquid unsaturated vinyl or similar monomer can then occur without substantial decrease in dimensional stabilization, which is in fact enhanced in some cases. However, no material dimensional stabilization is obtained if the ester is already in substantially polymeric form when it first contacts the cellulose.

In the preferred method of carrying out the present invention in which a two-stage impregnation is employed, the cellulose article to be treated is first impregnated with a solution having the unsaturated monomeric ester dissolved therein. The impregnating solution will be an aqueous one, if possible, and a number of the unsaturated esters which may be used are, themselves, soluble in water. If the ester to be employed is insoluble or only slightly soluble in water but has a free carboxyl group, it may be rendered water-soluble by conversion to a salt of ammonium hydroxide or a low molecular weight, volatile amine as disclosed in my Patent No. 2,891,019 which issued June 16, 1959. If the ammonium or volatile amine salt is employed, the free ester will again be formed when the impregnated cellulose material is heated to dry it, ammonia or the amine being driven off.

If the unsaturated ester is not sufficiently soluble in water, it can be solubilized in mixtures of water and a water-miscible, low-boiling, organic solvent, such as an alcohol or ketone. As examples of such solvents may be mentioned methyl alcohol, ethyl alcohol, isopropyl alcohol, acetone, and methyl ethyl ketone. Mixtures of water and such low boiling organic solvents have boiling points of 100° C. or lower, and they can be readily evaporated after impregnation to leave the ester deposited in the cellulose material.

The concentration of the impregnating solution will, of course, be controlled by the amount of the ester to be introduced into the cellulose material. It is a simple matter to determine how much of the solution will be absorbed by the particular cellulose material being treated, and sufficient of the ester will be dissolved in this solution that, after absorption and evaporation of the solvent, the desired amount of the ester is deposited in the cellulose material.

The amount of the unsaturated ester to be deposited in the cellulose material is not particularly critical. In general, the larger the amount of the ester present, the greater the degree of dimensional stabilization. As would be expected, certain of the esters are better dimensional stabilization agents than others, but ordinarily at least 1% of the ester based on the weight of the dried material must be present before any noticeable dimensional stabilizing effect can be noted. Usually the amount of ester present should be between 5 to 50% of the weight of the dried impregnated material. The exact quantity of the ester to be incorporated into the cellulose material will be determined by the type of material being treated, the type of stabilizing compound employed, and the percentage of the normal expansion and contraction which it is desired to remove.

The cellulose material being treated may be impregnated with the solution of the unsaturated ester by any suitable means, but immersion in the solution has been found the best and most practical procedure in the majority of cases. Most cellulose materials take up the solution readily and complete impregnation is usually realized within 1 to 8 minutes with about 4 minutes being the average time required.

After drying, which is preferably carried out by heating the wet impregnated article to a temperature of about 100 to 120° C., it is impregnated with the desired amount of vinyl, or similar, monomer with which the unsaturated ester is to be copolymerized. The amount of this monomer present as copolymer will determine the stiffness of the final product, and, accordingly, it is apparent that no definite figure or range can be set forth as critical in this regard. In general, however, it may be stated that from 1 to 40% of the compound having an ethylenic linkage should be present as copolymer in the final product based on the dry weight thereof.

It has been found that in most instances in the usual case in which the article being treated is a sheet composed of felted fibers of natural cellulose, a satisfactory final product will be obtained by dipping for a short period of time, such as 0.5 to 3.0 seconds, the dry article impregnated with an unsaturated ester in a bath composed of the vinyl, or similar, liquid monomeric compound containing an ethylenic linkage, and then heating the article impregnated with the liquid monomer to copolymerize it with the unsaturated ester already present. The heating to copolymerize the ester and liquid unsaturated monomer, preferably a vinyl compound, will be of the order of 50 to 120° C., and many of the compounds suitable for copolymerization, including the preferred compound, styrene, is so volatile at these temperatures that it has been found desirable to confine the article during heating to prevent a substantial loss of the liquid monomer. As a simple expedient for accomplishing this purpose, the article being treated is wrapped in a metallic foil, such as aluminum foil.

To minimize the evaporation of vinyl monomer, the unsaturated monomeric ester which was impregnated into the cellulose article can be made to copolymerize at room temperature with a vinyl compound thereby forming a gel which subsequently is converted into a hard copolymer by heat treatment.

Heating is terminated when copolymerization is substantially complete, and this will usually be after heating for a period of 3 to 10 minutes. Any excess monomer remaining may readily be removed by evaporation by heating the unconfined article.

The copolymerization is preferably catalyzed. Conventional polymerization catalysts such as the organic peroxides have been found suitable and as exemplary there may be mentioned methyl ethyl ketone peroxide, methyl amyl ketone peroxide, t-butyl perbenzoate, benzoyl peroxide, p-methane hydroperoxide, lauroyl peroxide, t-butyl hydroperoxide and the like.

Promoters for the copolymerization reaction should also be present and as examples of conventional promoters which may be employed, there may be mentioned the following: cobalt salts such as cobalt naphthenate, ferrous salts such as the ferrous salt of diethylene glycol monomeleate, manganese naphthenate and diethylaniline.

The catalyst and promoter are preferably dissolved in the liquid monomeric compound which is employed to impregnate the cellulose article. The amount of catalyst in the monomer will preferably range from 0.5 to 3.0% by weight, and the amount of promoter from .05 to 1.0% by weight as metal based on the weight of monomer.

The described process when carried out on a sheet composed of felted cellulose fibers, such as paper or cardboard, results in an article such as that shown in FIG. 1 of the drawings in which the numeral 1 designates the felted fibrous sheet and the numeral 2 the resinous copolymer with which it is impregnated. The sheet 1 has improved dimensional stability and any desired degree of stiffness depending upon the amount of liquid monomer which was originally present to take part in the copolymerization.

Laminated articles are readily produced by impregnating individual sheets of felted fibrous cellulose material with an unsaturated ester and a vinyl, or similar liquid monomer as described above. The plies are placed one upon the other and without being subjected to pressure other than required to ensure good contact, are heated to copolymerize the unsaturated ester and monomer as also described above. This produces a dimensionally stable laminate such as that shown in FIG. 2 of the drawings, the individual plies 3, 4 and 5 of which are firmly adhered one to the other. The individual plies exhibit as great a resistance to separation as is found in the usual laminate formed by pressing the plies between the heated platens of a press.

As stated earlier, while the above method involving the impregnation of the reactants into the cellulose article in two stages is that preferred because the finished product has greater dimensional stability and strength, some of the advantages of the present invention are realized by a method involving one-stage impregnation. In accordance with this procedure, a single solution is used for impregnating a cellulose material and this solution has dissolved therein the desired amounts of monomeric compound containing an ethylenic linkage, preferably a vinyl compound, and either a preformed monomeric unsaturated ester of any of the types described above, or the individual reactants which will produce such an ester upon heating.

Again, if possible, water is used as a solvent, but it is only in a relatively small number of cases that all of the ingredients of the solution will be water-soluble. If it is possible to use an aqueous solution, a water-soluble catalyst for the copolymerization such as sodium or potassium persulfate should be employed. The liquid unsaturated monomer containing an ethylenic linkage is, of course, itself a solvent for the unsaturated esters, and therefore impregnating solutions may be employed which contain no other solvent. However, such solventless mixtures are usually so viscous as to make impregnation of the cellulose material difficult and therefore it is ordinarily preferred to use an inert organic solvent in preparing the impregnating solution. This solvent may be of the type mentioned earlier, i.e. a low-boiling alcohol or ketone, and may be used by itself or in admixture with water. When an inert solvent is employed, whether it be aqueous or organic in nature, it will be evaporated during the heating of the impregnated cellulose material to effect copolymerization, and accordingly, in this instance, the material cannot be confined during heating or at least not during the initial stages thereof.

The temperatures and times of heating employed in a process using the one-stage impregnation will correspond with those mentioned earlier in connection with the two-stage impregnation process and similar proportions of reactants may be used. In each case, it is preferred that a catalyst and promoter be included in the impregnating solution and, when an organic solution is used, the catalyst is preferably of the organic peroxide type mentioned above.

The following examples are set forth as illustrative of, but not as limiting the present invention:

I. EXAMPLES ILLUSTRATING THE USE OF COPOLYMERS OF VINYL OR SIMILAR COMPOUNDS AND UNSATURATED ESTERS CONTAINING ONLY ONE POLYCARBOXYLIC ACID RESIDUE AND AT LEAST TWO POLYHYDRIC ALCOHOL RESIDUES IN THE MOLECULE (a) SYMMETRIC ESTERS

*Example 1*

A monomeric, symmetric, unsaturated ester was prepared by reacting 1052 grams (12 moles) of 2-butene-1,4-diol and 400 grams (4 moles) of succinic anhydride charged in a vessel equipped with a thermometer, mechanical stirrer, reflux condenser and return trap. The reactants were heated with stirring to 105° C. at which point a mild exothermic reaction ensued. The temperature rose spontaneously to 126° C. The reaction mixture was further heated and maintained at 175–185° C., until the acid number was below 50, the resulting product consisting essentially of a monomeric unsaturated ester having the formula HOCH$_2$CH=CHCH$_2$OOCCH$_2$CH$_2$
COOCH$_2$CH=CHCH$_2$OH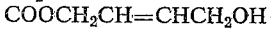

Excess 2-butene-1,4-diol was distilled from the product at a pressure of 10–30 mm. Hg. The product was an amber-colored liquid insoluble in water but soluble in acetone, ethyl alcohol and a mixture of one part of alcohol and 3 parts of water.

The monomeric unsaturated ester was impregnated, at concentrations of 3.75, 7.5, 15 and 30% in a solvent comprised of 1 part isopropanol and 3 parts of water, into cellulose fiber sheets 0.062″ thick prepared on a cylinder machine from unsized newsprint stock. Impregnations were carried out by completely submerging the sheets in these solutions, at room temperature, until they were thoroughly impregnated. A control sample sheet was used to determine completeness of impregnation. The amount of ester retained by the sheets was determined by drying them at 110° C., before and after impregnation, to constant weight. After determining the percent of ester absorbed, the sheets were measured accurately when dry and also after conditioning at 90% relative humidity and at 70° F. The sheets absorbed 6, 9, 17 and 34% ester and showed 15, 17, 48 and 90% of hygroexpansivity removed, respectively, across the predominating fiber direction.

The ester-impregnated sheets were dipped for 5 seconds into a bath of liquid styrene monomer containing 0.13% of cobalt naphthenate (6% Co) and 1.3% of t-butylperbenzoate. The sheets were then wrapped in aluminum foil to prevent excessive evaporation of styrene and heated for one hour at 110° C. After removal of excess styrene, it was found that the sheets containing 6, 9, 17 and 34% of the ester retained 31, 29, 20 and 13% copolymerized styrene and showed 47, 55, 61 and 88% hygroexpansivity removed, respectively. The tensile strength of the sheets containing the copolymer increased several times as compared to that of sheets impregnated with the ester alone.

*Example 2*

294 grams (3 moles) of maleic anhydride and 833 grams (8 moles) of 1,5-pentanediol was reacted according to the method described in Example 1. The resulting monomeric, unsaturated ester was a pale yellow liquid, insoluble in water but soluble in acetone, alcohol and a solution of 50 parts of isopropyl alcohol and 50 parts of water. It has the formula $$\text{HC}-\text{COO CH}_2\text{CH}_2\text{CH}_2\text{CH}_2\text{CH}_2\text{OH}$$
$$\overset{\|}{\text{HC}}-\text{COO CH}_2\text{CH}_2\text{CH}_2\text{CH}_2\text{CH}_2\text{OH}$$

Cellulose fiber sheets impregnated with 3.75, 7.5, 15 and 30% solutions of this ester in 50% aqueous isopropanol contained, after drying 5, 9, 18 and 32% ester and showed 16, 38, 54 and 76% hygroexpansivity removed, respectively. In accordance with the procedure described in Example 1, these same sheets were subsequently impregnated with styrene containing cobalt naphthenate as promoter and t-butyl perbenzoate as catalyst. The sheets were wrapped in aluminum foil and heated for one hour at 110° C. They retained, after removal of excess styrene, 38, 27, 26 and 22% copolymerized styrene and showed 65, 38, 65 and 75% hygroexpansivity removed, respectively. Tensile strength increases amounting to 2–5 times those of ester-impregnated sheets were obtained.

Paper strips impregnated with 15 and 30% solutions in 50% aqueous isopropanol of the ester described in this example contained, after removal of the solvent, 17% and 34% ester, respectively. These strips were then dipped into methyl methacrylate containing 0.13% cobalt naphthenate (6% Co) and 1.3% t-butylperbenzoate, wrapped in aluminum foil and heated for one hour at 110° C. The excess methyl methacrylate was removed and strips impregnated with 17% and 34% ester retained 18% and 11% methyl methacrylate as copolymer and showed 58% and 87% hygroexpansivity removed.

Paper strips containing 17% and 34% of the ester described in this example were dipped in vinyltoluene catalyzed with t-butylperbenzoate and containing cobalt naphthenate as a promoter, wrapped in aluminum foil and heated for one hour at 110° C. 18% and 6.5% respectively, of vinyltoluene were retained as copolymer and the sheets showed 70 and 93% hygroexpansivity removed.

In all instances, improved tensile strength was imparted to the copolymer-impregnated strips.

*Example 3*

343 grams (3.5 moles) of maleic anhydride and 789 grams (8.75 moles) of 1,4-butanediol were reacted according to the method described in Example 1. The symmetric ester so produced has the formula $$\text{HC OO O CH}_2\text{CH}_2\text{CH}_2\text{CH}_2\text{OH}$$
$$\overset{\|}{\text{HC}}\text{OO O CH}_2\text{CH}_2\text{CH}_2\text{CH}_2\text{OH}$$

It was a yellow-colored liquid insoluble in water but soluble in ethyl alcohol, methyl ethyl ketone and a solution comprised of 40 parts isopropyl alcohol and 60 parts of water.

The ester was impregnated into cellulose fiber sheets using solutions in a solvent consisting of 40 parts isopropanol and 60 parts of water, the solutions ranging from 6–33% concentration. The same sheets were dried, momentarily dipped in styrene and the styrene and the monomeric ester were copolymerized as described in Example 1. The sheets showed improved dimensional stability and substantial increase in tensile strength.

*Example 4*

392 grams (4 moles) of maleic anhydride and 1217 grams (16 moles) of propylene glycol were reacted according to the method described in Example 1. The symmetric ester thus produced was a yellow-colored liquid insoluble in water but soluble in a mixture of 35 parts isopropyl alcohol and 65 parts of water. It has the formula $$\text{HC OO O CH}_2\text{CH}_2\text{CH}_2\text{OH}$$
$$\overset{\|}{\text{HC}}\text{OO O CH}_2\text{CH}_2\text{CH}_2\text{OH}$$

Paper sheets containing 5–31% of this ester showed 9–88% of hygroexpansivity removed. The same sheets were treated by the procedure described in Example 1 to copolymerize the monomeric ester impregnant with styrene and the sheets then showed 49 to 85% hygroexpansivity removed with concurrent substantial improvement in tensile strength.

*Example 5*

584 grams (4 moles) of adipic acid and 1057 grams (12 moles) of 2-butene-1,4-diol were reacted according to the method described in Example 1. A brown-colored liquid, insoluble in water but soluble in a mixture of 50 parts isopropyl alcohol to 50 parts of water, was obtained. This liquid is an ester having the formula

HOCH$_2$CH=
  CHCH$_2$OOCCH$_2$CH$_2$CH$_2$CH$_2$COOCH$_2$CH=CHCH$_2$OH

Cellulose fiber sheets impregnated with a 30% solution of the ester were dried, dipped into styrene containing 0.13% of cobalt naphthenate (6% Co) and 1.3% of t-butylperbenzoate. After heating, as described in Example 1, the sheets thus obtained showed improved dimensional stability with greatly improved tensile strengths.

*Example 6*

348 grams (3 moles) of fumaric acid and 1273 grams (12 moles) of diethylene glycol were reacted according to the method described in Example 1. The symmetric ester thus prepared was a yellow-colored liquid soluble in a solution of 30 parts of isopropyl alcohol and 70 parts of water and has the formula $$\text{HO CH}_2\text{CH}_2\text{O CH}_2\text{CH}_2\text{O O C CH}$$
$$\overset{\|}{\text{HC}}\text{OOO CH}_2\text{CH}_2\text{O CH}_2\text{CH}_2\text{OH}$$

An assembly consisting of 3 plies of cellulose fiber sheets was prepared by impregnating the sheets with a 30% solution of the ester described in the above-mentioned solvent. The sheets were subsequently dried, dipped into styrene, placed one on top of the other in the predominating fiber direction and heated for 1 hour at about 110° C., using contact pressure only. There resulted a laminate which was a hard, tough board possessing improved dimensional stability and strength and exhibiting no tendency toward ply separation.

(b) ASYMMETRIC ESTERS

*Example 7*

A monomeric asymmetric dialkylol unsaturated acid ester was prepared by reacting 294 grams (3 moles) of maleic anhydride and 600 grams (3 moles) of polyethylene glycol, having an average molecular weight of 200, at 150° C. until titration of a sample indicated that the monoester was formed. At this stage, 469 grams (4.5 moles) of 1,5-pentanediol was added to the monoester. The reaction mixture was heated gradually to 210–220° C. and maintained at this temperature until a sample had an acid number below 25. The excess 1,5-pentanediol was removed by distillation at a pressure of 15–35 mm. Hg. The product was a light-yellow-colored liquid, insoluble in water but soluble in acetone and in a mixture composed of 30 parts of isopropyl alcohol and 70 parts of water. The ester may be represented by the formula $$\text{HC OO O CH}_2\text{CH}_2\text{CH}_2\text{CH}_2\text{CH}_2\text{OH}$$
$$\overset{\|}{\text{HC}}\text{OOO CH}_2\text{CH}_2(\text{O CH}_2\text{CH}_2)_2\text{O CH}_2\text{CH}_2\text{OH}$$

Paper sheets were impregnated with 7.5, 15 and 30% solutions of the ester of this example dissolved in solvent composed of 30 parts of isopropanol and 70 parts of water. After drying, they retained 10, 19 and 33% of the monomeric ester and showed, respectively, 27, 49 and 84% hygroexpansivity removed.

The sheets containing 19% and 33% of the ester were treated with monomeric styrene by the procedure described in Example 1, and they retained 32% and 19% styrene, respectively, as a copolymer with the ester. The sheets showed nearly threefold improvement in dry tensile strength, a seventeenfold improvement in wet tensile strength and greatly improved resistance to water absorption as compared to those of unimpregnated sheets.

In another experiment, paper sheets, impregnated with 18% of the ester described in this example, were dipped into a solution of 120 parts of glacial acrylic acid containing 0.6 part of cobalt naphthenate (6%) and 9 parts of t-butylperbenzoate. The glacial acrylic acid solution herein described was also brushed onto paper sheets containing 18% ester. After wrapping the sheets in aluminum foil and curing at elevated temperature, all boards thus treated showed improved dimensional stability and substantially increased tensile strength.

*Example 8*

392 grams (4 moles) of maleic anhydride and 417 grams (4 moles) of 1,5-pentanediol were heated to 70–80° C. At this point, an exothermic reaction developed and the temperature rose to 125–130° C. When the reaction subsided, after formation of the monoester, 849 grams (8 moles) of diethylene glycol were charged to the kettle and the temperature was raised to 205° C. until the acid number fell below 40. The excess diethylene glycol was distilled from the product at a pressure of 10–20 mm. Hg. 0.003% p-t-butylcatechol was added to the ester as inhibitor. The product was a yellow-colored liquid insoluble in water but soluble in a solution comprised of 30 parts of isopropanol and 70 parts of water. It has the formula

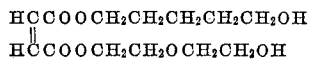

Paper sheets were impregnated with 7.5–30% solutions of this ester in the above-mentioned solvent, dried, and treated with catalyzed styrene monomer as described in Example 1 to effect copolymerization of the styrene and the absorbed unsaturated ester. Evaluation of these sheets showed that improved dimensional stability and fourfold to fivefold increase in tensile strength were obtained.

*Example 9*

392 grams (4 moles) of maleic anhydride, 417 grams (4 moles) of 1,5-pentanediol and 497 grams (8 moles) of ethylene glycol were reacted according to the method described in Example 7. The asymmetric ester thus produced was a light-yellow liquid, insoluble in water but soluble in a mixture of 30 parts of isopropyl alcohol and 70 parts of water. It has the formula

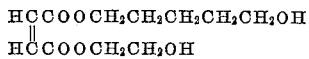

Paper sheets were impregnated with the ester described in this example and the absorbed ester was subsequently copolymerized with styrene. The sheets showed improved dimensional stability and improved tensile strength.

Paper sheets were also impregnated with 30 and 15% isopropanol solutions of this ester and retained, after drying, 33 and 19% of the ester. These sheets were then impregnated with vinyl acetate, in one instance, and vinyl toluene, in another instance. Each of the vinyl compounds contained 0.13% cobalt naphthenate (6% Co) and 1.3% t-butyl-perbenzoate. The sheets were wrapped in aluminum foil and heated 1 hour at 110° C. to effect copolymerization of the unsaturated ester impregnant and the vinyl compound. Evaluation of the sheets showed all had improved dimensional stability and tensile strength as compared to ester-impregnated and unimpregnated sheets.

*Example 10*

392 grams (4 moles) of maleic anhydride, 800 grams (4 moles) of polyethylene glycol having an average molecular weight of 200 and 497 grams (8 moles) of ethylene glycol were reacted according to the method described in Example 7. The ester was soluble in water, ethyl alcohol, isopropyl alcohol and mixtures thereof. It may be represented by the formula

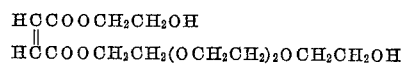

A 30% aqueous solution of the ester described was used to impregnate cellulose fiber sheets. The sheets were dried and certain of them were dipped into styrene containing 0.13% cobalt naphthenate (6% Co) and 1.3% of a solution containing 40% methyl ethyl ketone peroxide and 60% dimethyl phthalate. The same styrene solution was also brushed onto others of the cellulose sheets.

After copolymerization of reactant components in the cellulose sheets in the manner described in Example 1, they possessed improved dimensional stability, improved tensile strength and improved water resistance.

*Example 11*

345 grams (2.5 moles) of maleic anhydride and 370 grams (2.5 moles) of phthalic anhydride were first reacted with 1000 grams (5 moles) of polyethylene glycol having an average molecular weight of 200 and then with 901 grams (10 moles) of 2,3-butylene glycol according to the method described in Example 7. The product was an orange-colored liquid, insoluble in water but soluble in a mixture of 30 parts of isopropyl alcohol and 70 parts of water. It comprises an intimate mixture of esters which may be represented by the formulas:

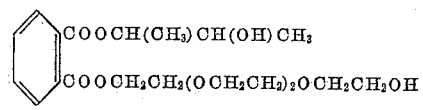

and

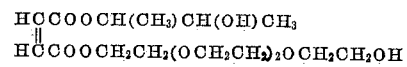

Paper sheets were impregnated with 30, 15, 7.5 and 3.75% solutions of the mixed esters of this example in 30 parts of isopropanol and 70 parts of water; the sheets were dried and treated with monomeric styrene as described in Example 1. The sheets thus produced containing a copolymer of styrene and the monomeric maleic acid ester were found to have improved dimensional stability and tensile strength.

*Example 12*

588 grams (6 moles) maleic anhydride, 1200 grams (6 moles) polyethylene glycol of average molecular weight 200 and 1273 grams (12 moles) of diethylene glycol were reacted according to the method described in Example 7. A light-yellow-colored liquid, soluble in water, ethyl alcohol and isopropyl alcohol, was obtained. The ester may be represented by the formula

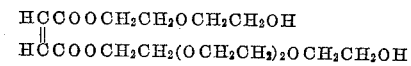

Paper sheets were impregnated with aqueous solutions of this ester ranging in concentration from 11–21%. The same sheets were then dried, dipped in styrene, wrapped in aluminum foil and heated to 110° C. for one hour. The resulting products containing a copolymer of the unsaturated ester and styrene were found to have improved dimensional stability and increased tensile strength.

*Example 13*

288 grams (0.75 mole) of the unsaturated asymmetric ester described in Example 12 and 72 grams (0.22 mole) of a saturated monoester prepared by reacting 200 grams (1 mole) of polyethylene glycol, having an average molecular weight of 200, and 146 grams (1 mole) of adipic acid, were stirred at room temperature until all the solids had dissolved. The blend was a light-yellow-colored solution, soluble in water, alcohol and acetone.

Paper strips were impregnated with aqueous solutions of this blend, the solutions ranging in concentrations from 3.75–30%, subsequently dried and impregnated with styrene and heated to copolymerize the components as described in Example 1.

The strips showed improved dimensional stability, increased wet and dry tensile strength and increased resistance to water absorption as compared to unimpregnated sheets.

II. EXAMPLES ILLUSTRATING THE USE OF COPOLYMERS OF VINYL OR SIMILAR COMPOUNDS AND UNSATURATED ESTERS CONTAINING ONLY ONE POLYHYDRIC ALCOHOL RESIDUE AND AT LEAST TWO POLYCARBOXYLIC ACID RESIDUES IN THE MOLECULE

*Example 14*

784 grams (8 moles) of maleic anhydride and 360 grams (4 moles) of 1,4-butanediol were reacted by heating at 145–150° C. until titration of a sample indicated that both of the hydroxyl groups of the glycol had been esterified. The diacid ester thus formed was a light-amber-colored solid, insoluble in water but soluble in 20 parts of isopropyl alcohol and 80 parts of water, and has the formula

HOOCCH
‖
HCOOCH₂CH₂CH₂CH₂OOCCH
‖
HCCOOH

Impregnation of cellulose-felted fiber sheets with ester solutions in the above-mentioned solvent to provide sheets containing from 7.5–30% ester showed 26–64% hygroexpansivity removed. The sheets were treated to copolymerize the monomeric unsaturated ester impregnant with styrene in accordance with the procedure described in Example 1. They showed 33–83% hygroexpansivity removed, and their tensile strength was greatly improved.

*Example 15*

800 grams (8 moles) of succinic anhydride and 352 grams (4 moles) of 2-butene-1,4-diol were reacted according to the method described in Example 15. The di-acid ester produced was a tan-colored solid, insoluble in water but soluble in a solution of 30 parts of isopropyl alcohol and 70 parts of water. It has the formula HOOCCH₂CH₂COOCH₂CH=
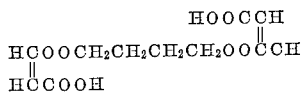
CHCH₂OOCCH₂CH₂COOH Cellulose fiber sheets containing 35% of this di-acid ester were prepared, and they showed 78% hygroexpansivity removed. The same sheets were treated as described in Example 1 to effect copolymerization of the monomeric unsaturated ester contained in the sheet with styrene, and they showed greatly improved tensile strength and 90% hygroexpansivity removed.

*Example 16*

A solution was prepared containing 90 parts 1,4-butanediol dimaleate, 56.3 parts of concentrated ammonium hydroxide (28.6% NH₃), 60 parts glacial acrylic acid, 0.5 part potassium persulfate and 410 parts water. Cellulose fiber sheets of 0.060" thickness were impregnated for 10 minutes with this solution and subsequently dried for one hour at 210° F. driving off the ammonia and effecting copolymerization of the ester and acrylic acid. The impregnated sheets showed improvement in dimensional stability (35% hygroexpansivity removed) and resistance to water absorption (123% as against 156% in blank).

III. EXAMPLES ILLUSTRATING THE USE OF COPOLYMERS OF VINYL OR SIMILAR COMPOUNDS AND UNSATURATED ESTERS CONTAINING ONLY ONE POLYCARBOXYLIC ACID RESIDUE AND ONLY ONE POLYHYDRIC ALCOHOL RESIDUE IN THE MOLECULE

*Example 17*

An unsaturated monoester was prepared by heating to 140° C. and stirring 588 grams (6 moles) of maleic anhydride and 1200 grams (6 moles) of polyethylene glycol having an average molecular weight of 200. At this point, the temperature rose spontaneously to 156° C. due to an exothermic reaction. Titration of the sample showed when one-half of the total acidity of the reaction mixture had been consumed, indicating that the formation of monoester was completed. The monoester was a light-yellow-colored liquid, soluble in water, ethyl and isopropyl alcohols, acetone and mixtures thereof. It may be represented by the formula

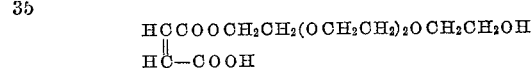

The monomeric unsaturated ester thus produced was impregnated into paper sheets with aqueous solutions at concentrations ranging from 7.5–15%. After drying, the sheets contained 9–20% monoester and showed 10–32% hygroexpansivity removed.

The ester-impregnated sheets were treated with styrene as described in Example 1 to effect copolymerization of the unsaturated monoester therewith. The resulting sheets showed improved dimensional stability and increased tensile strength.

*Example 18*

49 grams (0.5 mole) of maleic anhydride, 100 grams (0.5 mole) of polyethylene glycol, having an average molecular weight of 200, and 52 grams (0.5 mole) of styrene were stirred for several hours at room temperature until complete solution was effected. The product was a colorless liquid, insoluble in water but soluble in a solution consisting of 70 parts of isopropanol and 30 parts of water.

0.13% cobalt naphthenate (6% Co) and 1.3% t-butylperbenzoate were added to the solventless mixture described in this example. Paper strips were impregnated with this catalyzed mixture, wrapped in aluminum foil and heated one hour at 110° C. The strips, after removal of excess liquid, retained 48% of the copolymer so formed and showed only 24% hygroexpansivity removed.

Paper sheets impregnated with a 30% solution of the catalyzed mixture dissolved in isopropanol and water as described in this example were left unwrapped and heated one hour at 110° C. The sheets thus treated after removal of solvent, contained 24% copolymer and showed only 46% hygroexpansivity removed.

This example shows that a method involving impregnation of the paper with a mixture composed of the individual reactants which produce the unsaturated ester and monomeric vinyl compound is less effective than the preferred two-step process of this invention.

*Example 19*

809 grams (4 moles) of sebacic acid and 352 grams (4 moles) of 2-butene-1,4-diol were reacted according to the method described in Example 17. The monoester thus prepared was a light-amber-colored solid, insoluble in water but soluble in ethyl alcohol and in a mixture of 70 parts of isopropyl alcohol and 30 parts of water. It has the formula

$$HOOC(CH_2)_8COOCH_2CH=CHCH_2OH$$

Cellulose fiber sheets were prepared containing 27% of this ester, and they showed 88% hygroexpansivity removed in an atmosphere of varying humidity from 0–90%. The same sheets, after a short dip into catalyzed styrene followed by copolymerization of the styrene with the monoester as described in Example 1, showed 86% hygroexpansivity removed and several fold increased in tensile strength.

*Example 20*

88.9 grams (0.3 mole) of the monoester described in Example 17 and 34.7 grams (0.3 mole) of styrene catalyzed with 1.3% t-butylperbenzoate and 0.13% cobalt naphthenate (6% Co) were mixed and impregnated directly into cellulose fiber sheets. The sheets were wrapped in aluminum foil and heated at 110° C. for one hour to effect copolymerization of the absorbed unsaturated ester and styrene. The sheets were found to contain 19% of the copolymer and showed only 33% of hygroexpansivity removed.

Cellulose fiber sheets were also immersed in a 30% solution of the mixture of monoester and catalyzed styrene in a solvent consisting of 70% isopropanol and 30% water. After heating at 110° C. for one hour, the sheets contained 23% of the copolymer but showed only 44% hygroexpansivity removed in an atmosphere of varying humidity from 0 to 90%.

Thus, it is apparent that the two-step preferred process of impregnation is more effective than a process wherein monomeric ester and monomeric vinyl compounds are impregnated simultaneously in admixture.

*Example 21*

60 parts of polyethylene glycol 200 maleate monoester, 60 parts of glacial acrylic acid, 0.5 part of potassium persulfate and 280 parts of water were stirred in a vessel until clear solution was obtained. The solution was poured into a pan and 0.060″ thick cellulose fiber sheets were immersed therein for 10 minutes. They were later blotted and dried for 1 hour at 210° F. simultaneously effecting copolymerization of the ester and acrylic acid in situ. The above impregnating solution contained 15% by weight of the glycol of this example and 15% by weight of glacial acrylic acid. The impregnated sheets retained 25% of solids and lost 52% of their normal hygroexpansivity. The impregnated sheets also showed improved resistance to water absorption.

In the majority of the above examples, there has been set forth the structural formula of the monomeric, unsaturated ester employed. This was done to aid in the understanding of the invention, but it is to be understood that these formulas may not be completely accurate in all respects. For example, it is well known that under certain conditions, for example in the presence of either hydrochloric acid or iodine, diethyl maleate is converted to the corresponding isomer, the fumarate. It is conceivable that such isomerization may occur in the case of the present partial esters under conditions in which they are employed in the instant process, and the various formulas should be considered with this possibility in mind.

As will be apparent from the foregoing, the present invention may be used for the treatment of any material composed of cellulose, itself, as contrasted with derivatives thereof, such as cellulose ethers and esters. The invention finds its greatest use, however, in the treatment of articles composed of cellulose fibers, especially, fibers composed of cellulose in its natural state. Sheets of varying thickness made up of one or more plies and composed of felted natural cellulose fibers may be treated in accordance with the invention to produce articles having any desired degree of stiffness, strength, water resistance or dimensional stability. Examples of such articles are playing, tabulating and file cards, book covers, gaskets, paper backing for metal foil, gelatine films and abrasives, maps and charts, photographic papers, drawing papers and the like.

I claim:

1. The process of preparing a dimensionally stabilized article of improved characteristics and composed of cellulose fibers, comprising impregnating a cellulose fiber sheet with a solution, in an inert low-boiling solvent, of a monomeric ester of a polycarboxylic acid and a polyhydric alcohol, said ester containing only one residue of at least one of the reactants and said ester containing at least one carbon to carbon double bond in the molecule; heating said impregnated sheet to evaporate said solvent; impregnating the resulting dried sheet with a compatible polymerizable liquid monomeric compound containing an ethylenic linkage; and heating the resulting impregnated sheet to copolymerize said ester and said monomeric compound in situ to produce a resin containing as copolymer from 1 to 50% of said ester based on the combined weight of said ester and said cellulose fiber sheet and from 1 to 40% of said monomeric compound based on the weight of the final product.

2. The process of preparing a dimensionally stabilized article of improved characteristics and composed of cellulose fibers, comprising impregnating a cellulose fiber sheet with a solution, in an inert low-boiling solvent, of a monomeric ester of a dicarboxylic acid and a dihydric alcohol, said ester containing only one dicarboxylic acid residue and only one dihydric alcohol residue and said ester containing at least one carbon to carbon double bond in the molecule; heating said impregnated sheet to evaporate said solvent; impregnating the resulting dried sheet with a compatible polymerizable liquid monomeric compound containing an ethylenic linkage; and heating the resulting impregnated article to copolymerize said ester and said monomeric compound in situ to produce a resin containing as copolymer from 1 to 50% of said ester based on the combined weight of said ester and said cellulose fiber sheet and from 1 to 40% of said monomeric compound based on the weight of the final product.

3. The process of claim 2 in which said sheet is confined while heating to produce said copolymer, whereby evaporation of said monomeric liquid compound is prevented.

4. The process of claim 2 in which said liquid monomeric compound is a vinyl compound.

5. The process of claim 4 in which said vinyl compound is styrene.

6. The process of claim 5 in which said dicarboxylic acid is an α,β-unsaturated dicarboxylic acid.

7. The article produced by the process of claim 1.

8. The process of preparing a dimensionally stabilized laminated article comprising impregnating a plurality of cellulose fiber sheets with a solution, in an inert low-boiling solvent, of a monomeric ester of a polycarboxylic acid and a polyhydric alcohol, said ester containing only one residue of at least one of the reactants and said ester containing at least one carbon-to-carbon double bond in the molecule; heating said impregnated sheets to evaporate said solvent; impregnating the resulting dried sheets with a compatible polymerizable liquid monomeric compound containing an ethylenic linkage; superimposing said impregnated sheets; and heating said superimposed sheets in the absence of substantial pressure to copolymerize in situ said monomeric ester and said compatible polymerizable liquid monomeric compound to produce a resin and tightly adhere said sheets together, said resin containing as copolymer from 1 to 50% of said ester based on the combined weight of said ester and said cellulose fiber sheets and from 1 to 40% of said monomeric compound based on the weight of said article.

9. The article produced by the process of claim 8.

References Cited in the file of this patent

UNITED STATES PATENTS

| | | |
|---|---|---|
| 2,115,708 | Dreyfus | May 3, 1938 |
| 2,629,701 | Ericks | Feb. 24, 1953 |
| 2,851,379 | Staudinger et al. | Sept. 9, 1958 |
| 2,879,249 | Raichle | Mar. 24, 1959 |
| 2,890,144 | Robitschek | June 9, 1959 |
| 2,912,413 | Baer | Nov. 10, 1959 |
| 2,941,976 | Philipson | June 21, 1960 |